A. TAPLIN.

Lamp-Burner.

No. 6,650. Reissued Sept. 21, 1875.

Witnesses
John Beeler
Fred Haynes

Alvin Taplin
by his Attorneys
Brown & Allen

N. PETERS, PHOTO-LITHOGRAPHER, WASHINGTON, D. C.

UNITED STATES PATENT OFFICE.

ALVIN TAPLIN, OF FORESTVILLE, ASSIGNOR TO THE BRISTOL BRASS AND CLOCK COMPANY, OF BRISTOL, CONNECTICUT.

BEST AVAILABLE COPY

IMPROVEMENT IN LAMP-BURNERS.

Specification forming part of Letters Patent No. 119,061, dated September 19, 1871; reissue No. 6,650, dated September 21, 1875; application filed September 11, 1875.

*To all whom it may concern:*

Be it known that I, ALVIN TAPLIN, of Forestville, in the county of Hartford and State of Connecticut, have invented a new and useful Improvement in Lamp-Burners; and I do hereby declare that the following is a full, clear, and exact description of the same, reference being had to the accompanying drawing, which forms part of this specification, and in which—

Figure 1:
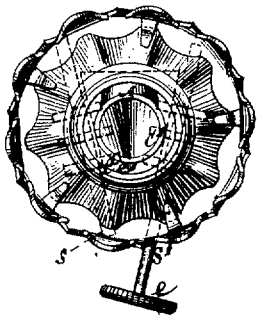
Figure 2:
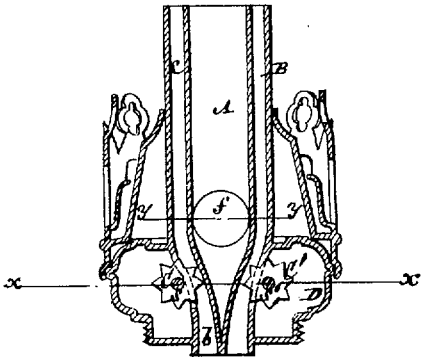
Figure 5:
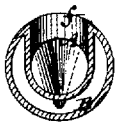
Figure 4:
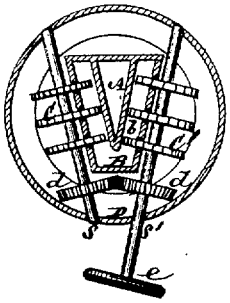
Figure 3:
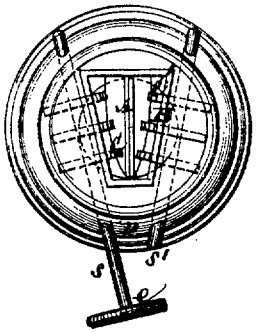

Figure 1 represents a top view or plan of my improved burner; Fig. 2, a vertical longitudinal section of the same; Fig. 3, an inverted plan or under view thereof; Fig. 4, a transverse section taken as indicated by the line *x x* in Fig. 2, and Fig. 5 a similar view through the line *y y*.

This improvement relates to that description of lamp-burners in which a single flat wick, as it is introduced or fed through the wick-tube, is made, when emerging from the latter, to assume an angular form. The invention consists in a combination of duplicate wick raising and lowering ratchets, or rows of ratchets having independent shafts, which are geared together at one end of each, and an inner wick-guiding tube made at its lower portion, of a V or U shape transversely to the length of the wick-tube, and the sides of which are parallel with the axes of the ratchets. This inner tube may be gradually spread or run into an annular form at its upper portion, and is surrounded by an outer tube, which is also of circular form above.

In the accompanying drawing, A represents the inner tube, and B the outer tube, between which the wick is introduced and operated, said tubes constituting the wick-tube proper. The outer tube is open at its top and bottom, but the inner tube A may be closed at its bottom, and its lower portion is of a V or U shape in its horizontal section. The lower portion of the outer tube B may be of corresponding configuration, presenting an opening, *b*, which, by the construction of the tubes A and B, is converted into an annular passage, *c*, above.

To introduce the flat wick into the wick-tube—that is, into the passage *b c* between the two tubes A and B—it is doubled in its center longitudinally at its entering end, and inserted at the lower opening *b*, through which it is pushed up into the said passage far enough to be griped by two rows of ratchets, C C′, which enter through slots in the outer hole B. These duplicate wick raising and lowering ratchets C C′ have independent shafts *s s′*, which are geared together at one end of each by means of spur-wheels *d d*, and may be operated by a single mill-head, the shaft or spindle carrying which projects through the cap D of the burner.

When the shafts of the ratchets are set diverging in relation with each other, as they are when the inner tube A is of V shape, then the spur-wheels *d d* may be on the converging ends thereof; but the sides of the inner tube A should be parallel with the axes of the ratchets where the latter bear upon the wick.

The flat or approximately straight sides of the lower portion of the inner tube A on its exterior establish broad and uniform bearings for the wick, and for the duplicate rows of ratchets to get a fair hold of it, free from objectionable compression as regards expulsion of the oil, by reason of the separation of its folded portions, and as the wick rises in the tube it is gradually made to assume an annular form before and as it emerges from the entire tube. The inner tube A is joined at the back of its lower portion to the outer tube B, and an opening, *f*, made in the latter at the upper part of such junction, to admit air to the interior of the wick shortly before or as it assumes its closed or circular form.

I claim—

The ratchets C C′, having their two shafts *s s′* geared together by spur-wheels *d* at one end of each, in combination with the inner tube of a V or U shape, the sides of which are parallel with the axes of the ratchets, essentially as shown and described.

ALVIN TAPLIN.

Witnesses:
GEO. W. BROWN,
DAN. A. MILLER.